United States Patent
Atsumi (10) Patent No.: US 10,836,417 B2
(45) Date of Patent: *Nov. 17, 2020

(54) ASSEMBLED-TYPE TRAVELING CARRIAGE

(71) Applicant: ATSUMI REAL ESTATE & CORPORATION INC., Mitaka-shi (JP)

(72) Inventor: Kazuya Atsumi, Tokyo (JP)

(73) Assignee: ATSUMI REAL ESTATE & CORPROATION, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/834,400

(22) Filed: Mar. 30, 2020

(65) Prior Publication Data
US 2020/0223464 A1 Jul. 16, 2020

Related U.S. Application Data (63) Continuation of application No. 16/150,752, filed on Oct. 3, 2018, now Pat. No. 10,625,763, which is a
(Continued)

(30) Foreign Application Priority Data

Apr. 7, 2016 (JP) .................................. 2016-077184

(51) Int. Cl.
*B62B 3/02* (2006.01)
*B61B 13/00* (2006.01)
(Continued)

(52) U.S. Cl.
CPC ................ *B62B 3/02* (2013.01); *B61B 13/00* (2013.01); *B62D 21/14* (2013.01); *B62D 39/00* (2013.01);
(Continued)

(58) Field of Classification Search
CPC ....... B62B 3/02; B62B 5/065; B62B 2205/18; B62B 2205/12; B65G 35/00; B61B 13/00; B62D 21/14; B62D 39/00
See application file for complete search history.

(56) References Cited

U.S. PATENT DOCUMENTS

2007/0180620 A1 8/2007 Bellingroth
2014/0183832 A1 7/2014 Wang et al.

FOREIGN PATENT DOCUMENTS

CN 2318104 Y 5/1999
CN 2894422 Y 5/2007
(Continued)

OTHER PUBLICATIONS

International Search Report issued by the Japan Patent Office for corresponding International Patent Application No. PCT/JP2017/014144, dated Jun. 27, 2017, with an English translation.
(Continued)

*Primary Examiner* — Jacob B Meyer
(74) *Attorney, Agent, or Firm* — Myers Wolin, LLC (57) ABSTRACT

The assembled-type traveling carriage includes: the telescopic cylindrical body being an extendable telescopic cylindrical body rotatably provided with a first screw at each end thereof, and incorporating an actuator configured to extend and withdraw a nest; a joint block provided with a second screw; a traveler rotatably provided with the first screw and attached a driving device thereto; and a coupling rod rotatably provided with the first screw on each end thereof. A first planar frame body is assembled by screwing joint blocks to four of the telescopic cylindrical bodies, screwing the travelers to the joint blocks such that the travelers are positioned on extension lines of the telescopic
(Continued)

cylindrical bodies, and coupling one ends of the four telescopic cylindrical bodies to one another by the coupling rods through the joint blocks.

20 Claims, 7 Drawing Sheets

Related U.S. Application Data continuation of application No. PCT/JP2017/014144, filed on Apr. 4, 2017.

(51) Int. Cl.
*B65G 35/00* (2006.01)
*B62D 21/14* (2006.01)
*B62D 39/00* (2006.01)
*B62B 5/06* (2006.01)

(52) U.S. Cl.
CPC .............. *B65G 35/00* (2013.01); *B62B 5/065* (2013.01); *B62B 2205/12* (2013.01); *B62B 2205/18* (2013.01)

(56) References Cited

FOREIGN PATENT DOCUMENTS

| CN | 203 252 648 U | 10/2013 |
|---|---|---|
| CN | 204060721 U | 12/2014 |
| CN | 204210518 U | 3/2015 |
| CN | 104648448 A | 5/2015 |
| CN | 204659770 U | 9/2015 |
| CN | 105172472 A | 12/2015 |
| CN | 105172852 A | 12/2015 |
| EP | 2 404 806 A1 | 1/2012 |
| JP | 50-113366 A | 9/1975 |
| JP | 6-158866 A | 6/1994 |
| JP | 7-232644 A | 9/1995 |
| JP | 2001-260892 A | 9/2001 |
| JP | 2005-271687 A | 10/2005 |
| JP | 2007-253767 A | 10/2007 |
| JP | 2012-56006 A | 3/2012 |
| JP | 5855296 B1 | 2/2016 |

OTHER PUBLICATIONS

Written Opinion of the International Searching Authority issued by the Japan Patent Office for corresponding International Patent Application No. PCT/JP2017/014144, dated Jun. 27, 2017.
Written Opinion of the International Searching Authority issued by the Japan Patent Office for corresponding International Patent Application No. PCT/JP2017/014144, dated Jun. 27, 2017, with English translation.
First Notification of Office Action issued by the China National Intellectual Property Administration for corresponding Chinese Patent Application No. 20178002174.X, dated Dec. 23, 2019, with an English translation.
Extended European search report with supplementary European search report and the European search opinion issued by the European Patent Office for corresponding European Patent Application No. 17779149.8, dated Nov. 5, 2019.
Restriction Requirement issued by the United States Patent and Trademark Office for corresponding U.S. Appl. No. 16/150,752, dated Jul. 1, 2019.
Non-Final Office Action issued by the United States Patent and Trademark Office for corresponding U.S. Appl. No. 16/150,752, dated Aug. 30, 2019.
Notice of Allowance issued by the United States Patent and Trademark Office for corresponding U.S. Appl. No. 16/150,752, dated Dec. 17, 2019.

ASSEMBLED-TYPE TRAVELING CARRIAGE

CROSS-REFERENCE TO RELATED APPLICATIONS

This application is a continuation application of U.S. application Ser. No. 16/150,752, which was filed on Oct. 3, 2018, which is a continuation application of International PCT Application No. PCT/JP2017/014144 which was filed on Apr. 4, 2017, which claims priority to Japanese Patent Application No. 2016-077184 which was filed on Apr. 7, 2016, the entire contents of each are herein incorporated by reference.

TECHNICAL FIELD

The present disclosure relates to a traveling carriage, particularly relates to a widenable and extendable traveling carriage assembled with multiple parts.

BACKGROUND ART

A traveling carriage is disclosed in, for example, Japanese Laid-open Patent Publication No. 2005-271687 and Japanese Laid-open Patent Publication No. 2012-56006.

A "conveyor carriage" disclosed in Japanese Laid-open Patent Publication No. 2005-271687 is "a carriage capable of, for example, conveying a back-pack sprayer" and is proposed to achieve the object to "provide a conveyer carriage useful to reduce the load on farmworkers". As means to attain the object, the disclosed "conveyor carriage device is configured by, for example, a rectangular mount top, an installing frame, a handle, a brake, wheels, and castors. Except for the tires of the wheels and the castors, the parts of the conveyor carriage are made from an aluminum alloy. A pair of fixing members, a pair of long holes, and a pair of fixing bolts are provided to the mounting top. Each fixing member is a rod having a hexagon section and is attached so as to project perpendicularly in an upright direction. Each long hole is formed on the mounting top along the longitudinal direction of the top to have a predetermined length. The fixing member is provided to be slidable in the left-to-right direction along the long hole".

A "product manufacturing device and an operation carriage" disclosed in Japanese Laid-open Patent Publication No. 2012-56006 is proposed to achieve the object to "provide a product manufacturing device and an operation carriage that can efficiently use the operation area and optimize the carrying manner to reduce the cost". As means to attain the object, the "product manufacturing device and the operation carriage" have configuration that "in a conveyor 3, which carries multiple operation carriages arranged in series in a predetermined direction, an automated guided vehicle (AGV) moves the operation carriages, having moved to the end point, to the starting point of the conveyer 2, which moves the multiple operation carriages in the reverse direction of the conveyer 3 and switched back the operation carriages having moved to the end point of the conveyor at a switch-back area to move the carriages to the starting point of the conveyer 3".

PRIOR ART REFERENCE

Patent Literature

[Patent Literature 1] Japanese Laid-open Patent Publication No. 2005-271687

[Patent Literature 2] Japanese Laid-open Patent Publication No. 2012-56006

However, the "conveyor carriage" disclosed in Japanese Laid-open Patent Publication No. 2005-271687 and the "product manufacturing device and the operation carriage" disclosed in Japanese Laid-open Patent Publication No. 2012-56006 have difficulty in widening and elongating the carriages to flexibly deal with the operation condition and environment of the carriages. With the foregoing problems in view, the object of the present disclosure is to provide a carriage that can widen and elongate to deal with the operation condition and environment of the carriage.

SUMMARY

In one embodiment, the assembled-type traveling carriage includes: a telescopic cylindrical body being an extendable telescopic cylindrical body rotatably provided with a first one of a male screw and a female screw collectively serving as screw means at each end thereof, and incorporating an actuator configured to extend and withdraw a nest; a joint block provided with a second one of the screw means; a traveler rotatably provided with a first one of the screw means and attached a driving device thereto; and a coupling rod rotatably provided with a first one of the screw means on each end thereof, wherein a first planar frame body being in a rectangular shape seen from a plane is assembled by screwing joint blocks to four of the telescopic cylindrical bodies, screwing the travelers to the joint blocks such that the travelers are positioned on extension lines of the telescopic cylindrical bodies, and coupling one ends of the four telescopic cylindrical bodies to one another by the coupling rods through the joint blocks.

Effect of Disclosure

The present disclosure assembles a carriage, which is a self-propellable first planar frame by four telescopic cylindrical bodies, four joint blocks, four coupling rods, and four travelers, and the carriage can be planarily extended, centering around the first planar frame. This means that the traveling carriage can be widened or elongated according to various operation conditions and environment. If the coupling rods are formed to be of an extendable telescopic type, it is possible to obtain a planar frame having an arbitrary dimension.

DETAILED DESCRIPTION OF THE DISCLOSURE

Description will now be made in relation to embodiments 1 to 4 as embodiments with reference to FIGS. 1A to 7. Throughout FIGS. 1A to 7, the reference number 1 represents an assembled-type traveling carriage according to Embodiment 1; the reference number 2 represents an assembled-type traveling carriage according to Embodiment 2; the reference numbers 10 and 10A represent telescopic cylindrical bodies; the reference number 11 represents a male screw of the telescopic cylindrical body 10 or 10A; the reference number 12 represents a storage battery; the reference number 13 represents an electric motor; the reference number 15 represents a receiver; the reference number 20 represents a joint block; the reference number 21 represents a joint block main body; the reference number 22 represents a female screw of a joint block; the reference number 25 represents a joint block according to Embodiment 4; the reference number 251 represents a joint block main body according to Embodiment 4; the reference number 252 represents a male screw according to Embodiment 4; the reference number 30 represents a traveling wheel, the reference number 31 represents a traveling wheel main body; the reference number 32 represents an electric driving motor; the reference number 33 represents a male screw of a traveling wheel; the reference number 35 represents a following wheel; the reference number 36 represents a groove wheel set; the reference number 40 represents a coupling rod; the reference number 41 represents a male screw of a coupling rod; the reference number 50 represents a telescopic cylindrical body set; and the reference number 60 represents a rope. The reference number 110 represents the cylindrical main body of the telescopic cylindrical body 10A; the reference number 111 represents a hydraulic cylinder; the reference number 111a represents a cylinder tube; the reference number 111b represents a piston rod; the reference number 111c represents a piston; the reference number 111e represents a first oil chamber; the reference number 111f represents a second oil chamber; and the reference number 16 represents an accumulator.

Here, screw means collectively refers to a pair of a male screw and a female screw, but does not mean a particular individual article. As the screw means, the following embodiments include first screw means that couples one end of a telescopic cylindrical body 10 to the joint block 20 (first joint block); second screw means that couples the other end of the telescopic cylindrical body 10 to a joint block 20 (second joint block); third screw means that couples a joint block 20 to a coupling rod 40; and fourth screw means that couples a joint block 20 to a traveling wheel 30 or a following wheel 35.

In the following embodiments, one of the first screw means and one of the second screw means are formed by the male screws 11 on the both ends of a telescopic cylindrical body 10, and the other of the first screw means and the other one of the second screw means are formed by the female screws 22 of a joint block 20. One of the third screw means is formed by the female screw 22 of a joint block 20 or the male screw 252 of a joint block 25 while the other of the third screw means is formed by the male screw 41 or a female screw of a coupling rod 40. One of the fourth screw means is formed by the female screw 22 of a joint block 20 while the other of the fourth screw means is formed by the made screw 33 of a traveling wheel 30 or the following wheel 35.

In the following embodiments, the storage battery 12 serves as an energy storing unit and the first storage battery of the present disclosure, the electric motor 13 serves as an actuator of the present disclosure, the driving motor 32 serves as a driving device of the present embodiment; the traveling wheel 30 serves as a traveler of the present disclosure; and the following wheel 35 serves as a following traveler of the present embodiment. The hydraulic cylinder 111 serves as an actuator of the present disclosure, and the accumulator 16 serves as an energy storage unit of the present disclosure.

Embodiment 1

First of all, description will now be made in relation to the assembled-type traveling carriage 1 according to Embodiment 1 with reference to FIG. 1A to FIG. 4.

Figure 2:
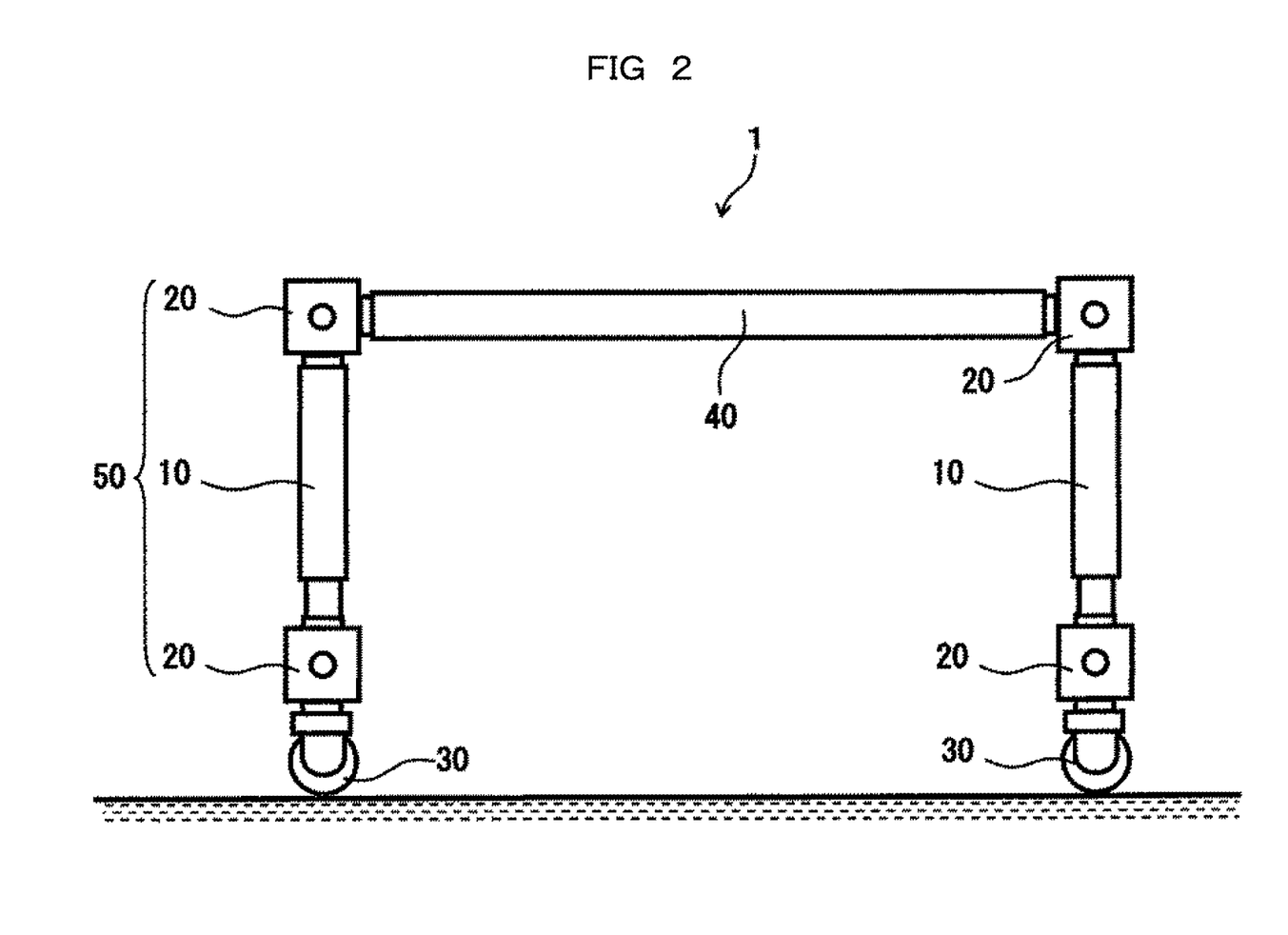
FIG. 2 is a side view of the assemble of an assembled-type traveling carriage according to Embodiment 1.

The assembled-type traveling carriage 1 consists of four telescopic cylindrical bodies 10, eight joint blocks 20, four traveling wheels 30, and four coupling rods 40.

Figure 1A:
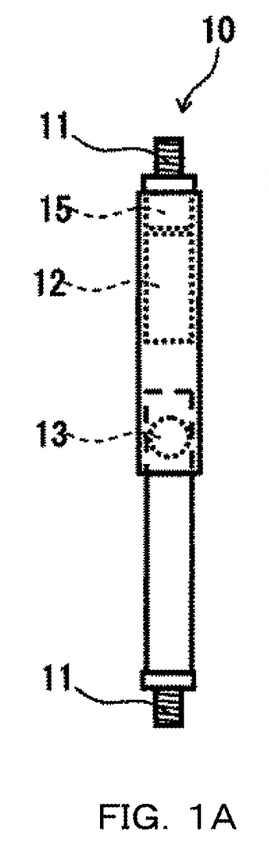
FIGS. 1A-1E are side views of components of an assembled-type traveling carriage according to Embodiment 1, FIG. 1A illustrating a telescopic cylindrical body, FIG. 1B illustrating a joint block, FIG. 1C illustrating a traveling wheel, FIG. 1D illustrating a following wheel, and FIG. 1E illustrating a coupling rod.

A telescopic cylindrical body 10 has a telescopic cylindrical body formed of a polygon pipe or a round pipe, and includes a storage battery 12, an electric motor 13 to extend and withdraw the nests, a switch (not shown) that switches the electric current from the storage battery 12 to the electric motor 13, and the receiver 15. Additionally, to the both end of the telescopic cylindrical body 10, a male screw 11, which is one of the first screw means, is attached so as to be rotatable with respect to the telescopic cylindrical body 10.

The nests of the telescopic cylindrical body 10 may be extended and withdrawn hydraulic means in place of electric means.

Figure 4:
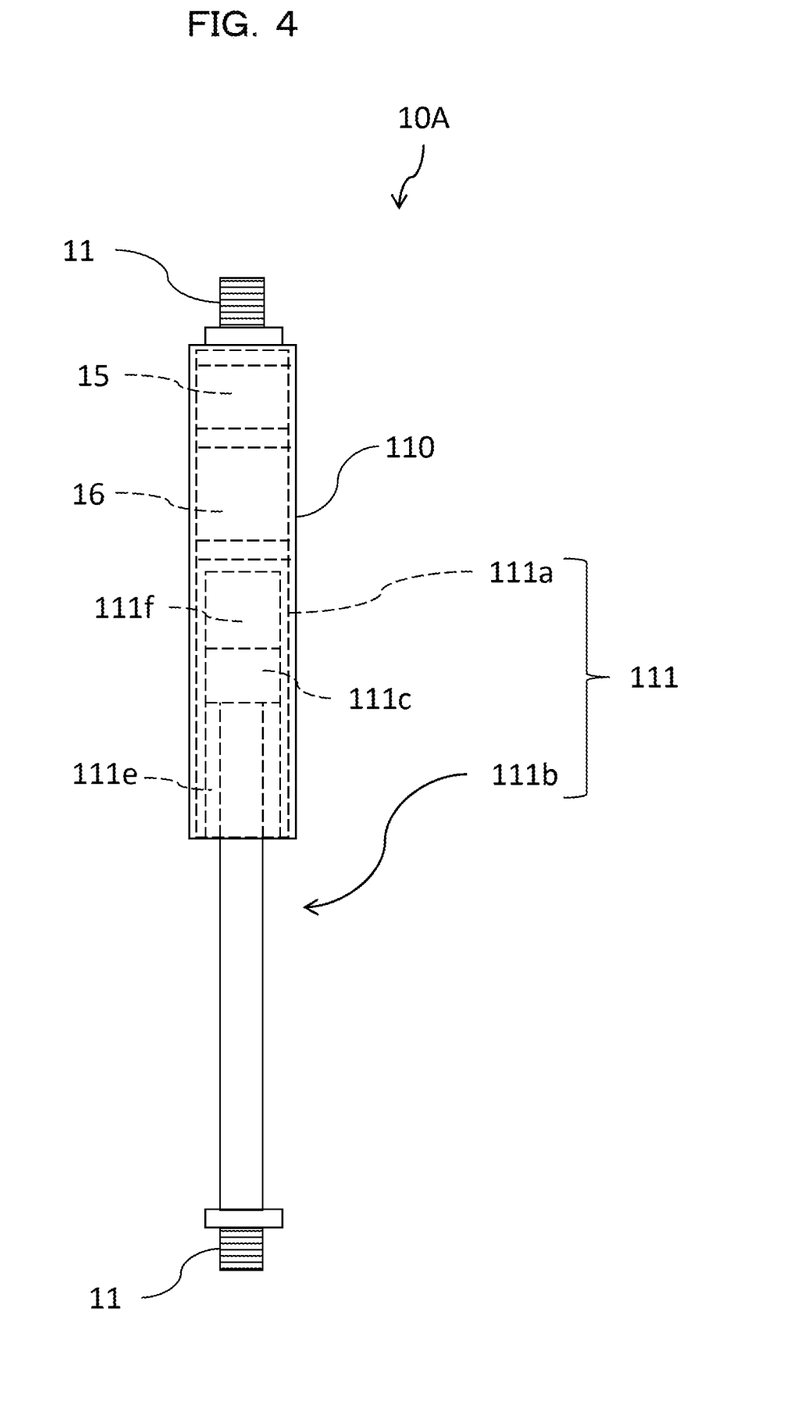
FIG. 4 is a schematic diagram illustrating the configuration of a modification to the telescopic cylindrical body of the assembled-type traveling carriage according to Embodiment 1.

Specifically, as illustrated in FIG. 4, the receiver 15, the accumulator 16, and the cylinder tube 111a of the hydraulic cylinder 111 are arranged in this sequence from the top of the drawing in the cylindrical main body 110 of the telescopic cylindrical body 10A. Additionally, the switch (not shown) is included in the cylindrical main body 110.

The hydraulic cylinder 111 includes the cylinder tube 111a and a piston rod 111b which is slidably placed in the cylinder tube 111a and which forms nests by protruding from the cylindrical main body 110. The inner space of the cylinder tube 111a is divided into the first oil chamber 111e to withdraw the piston rod 111b and the second oil chamber 111f to extend the piston rod 111b by the piston 111c of the piston rod 111b.

The accumulator 16 and the oil chambers 111e and 111f are coupled to one another via pipes, each of which is provided with a valve (pipes and valves are not shown).

When a control signal is input from a transmitter to be detailed below into the switch via the receiver 15, the switch controls the open and close of the valves. This controls supplying and draining of hydraulic oil (hydraulic pressure) among the oil chambers 111e and 111f and the accumulator 16, so that the extended length of the piston rod 111b can be adjusted.

The remaining configuration is the same as the telescopic cylindrical body 10 and repetitious description is omitted here.

Figure 1B:
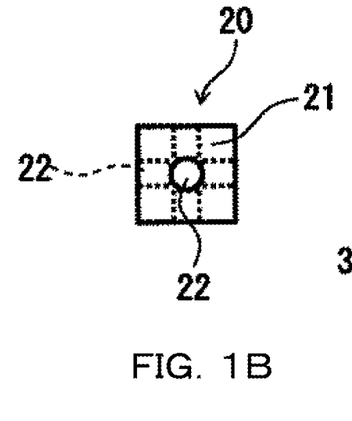

A joint block 20 is formed of a joint block main body 21 in the form of a regular hexahedron, i.e., a cube, and a female screw 22 threaded on each face. The first screw means is formed of the female screw 22 configured to be screwed with the male screw 11.

Figure 1C:
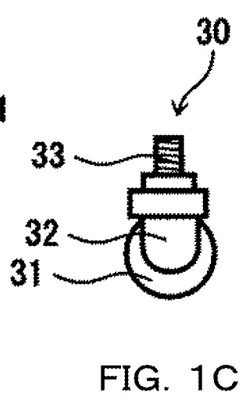
Figure 1D:
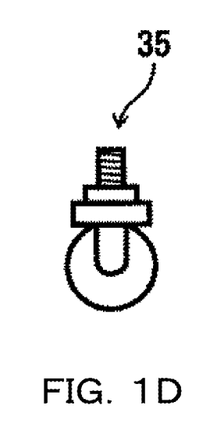

Each traveling wheel 30 is formed of a traveling wheel main body 31, a male screw 33 rotatably fixed (provided) to the traveling wheel main body 31, and a driving motor 32 (hereinafter also referred to as an electric motor) attached to the traveling wheel main body 31. The driving motors 32 drives the respective traveling wheel main bodies 31 independently of one another and consequently drive the traveling wheel main bodies 31 at different rotation speed, so that the traveling direction of the assembled-type traveling carriage 1 can be changed. For the assembled-type traveling carriage 1, following wheels 35 are prepared which have the same specification as the traveling wheels 30 except for not attaching the driving motors 32 thereto. The traveling wheel 30 and the following wheel 35 may be of course replaced by crawler belts (travelers, following travelers).

Figure 1E:
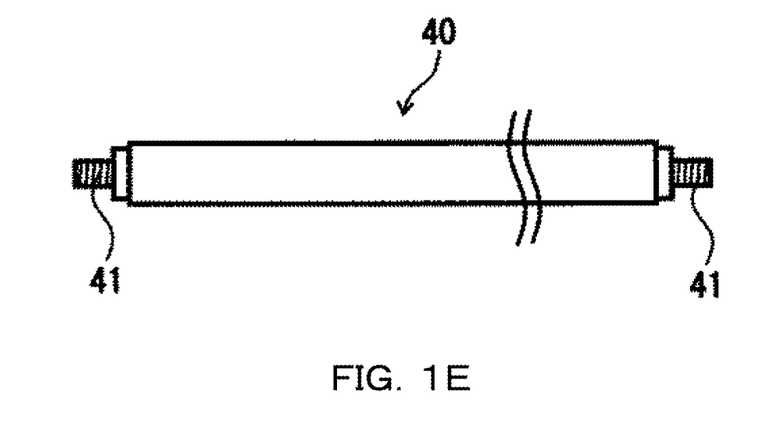

A coupling rod 40 has a cylindrical body formed of a polygon pipe or a round pipe, and male screws 41 are attached to the both ends of the coupling rod 40 so as to be rotatable with respect to the coupling rod 40. Alternatively, the coupling rod 40 may be of an extendable telescopic type. In this alternative, the extending means can be of electric, hydraulic, or manual. Further alternatively, the coupling rod 40 may have the same configuration as the telescopic cylindrical body 10 or 10A.

The assembled-type traveling carriage 1 is assembled in the following manner.

(1) Joint blocks 20 are screwed with a telescopic cylindrical body 10 and a traveling wheel 30 is further screwed with one of the joint blocks 20 to assemble a telescopic cylindrical body set 50. Since the male screw 11 of the telescopic cylindrical body 10 and the male screw 33 of the traveling wheel 30 are rotatably attached, the male screw 11 and the male screw 33 can be fixed to the joint block 20 by clockwise rotating the male screw 11 and the male screws 33 to be screwed into female screws 22 of the joint block 20. In regard of the traveling wheel 30, which is connected to the telescopic cylindrical body 10 through the joint block 20, the storage battery 12 in the telescopic cylindrical body 10 is electrically connected to the driving motor 32 of the traveling wheel 30.

(2) The assembly of the assembled-type traveling carriage 1 is completed by coupling four assembled telescopic cylindrical body sets 50 by four coupling rods 40 through the joint blocks 20 (first joint blocks) positioned at the upper portions of the respective telescopic cylindrical body sets 50. The coupling a joint block 20 and a coupling rod 40 is the same manner as the above item (1). In this case, the coupling rods 40 coupled to one another through the joint blocks 20 positioned at the upper portions assemble the first planar frame.

Alternatively, the assembled-type traveling carriage 1 may be assembled by coupling the four telescopic cylindrical body sets 50 by four coupling rods 40 through the joint blocks 20 (second joint blocks) positioned at the lower portions of the respective telescopic cylindrical body sets 50, and two of the four traveling wheels 30 of the assembled-type traveling carriage 1 being assembled may be replaced by the following wheels 35. Further alternatively, a stereoscopic frame can be assembled by screwing coupling rods 40 into the joint blocks 20 positioned at the upper and lower portions of the telescopic cylindrical bodies 10. Specifically, a stereoscopic frame can be assembled through assembling a first planar frame and the second planar frame respectively by the coupling rods 40 coupled to one another through the joint blocks 20 positioned at the upper portions and the coupling rods 40 coupled to one another through the joint blocks 20 positioned at the lower portions.

The assembled-type traveling carriage 1 can be further widened (in the lateral direction perpendicular to the traveling direction) or extended (in the traveling direction) by further coupling telescopic cylindrical body sets 50 to the assembled-type traveling carriage 1 by coupling rods 40. Using expandable coupling rods 40 makes it possible to assemble a planar frame having an arbitrary dimension (a frame formed of four telescopic cylindrical bodies 10 by the coupling rods 40 through the joint blocks 20 and being rectangular when seen from the plane) and thereby the dimension of the assembled-type traveling carriage 1 can be freely changed and be sized suitably for the using environment. In addition, the dimension of the assembled-type traveling carriage 1 can conform to an article placed on thereon to fix the article.

Figure 3:
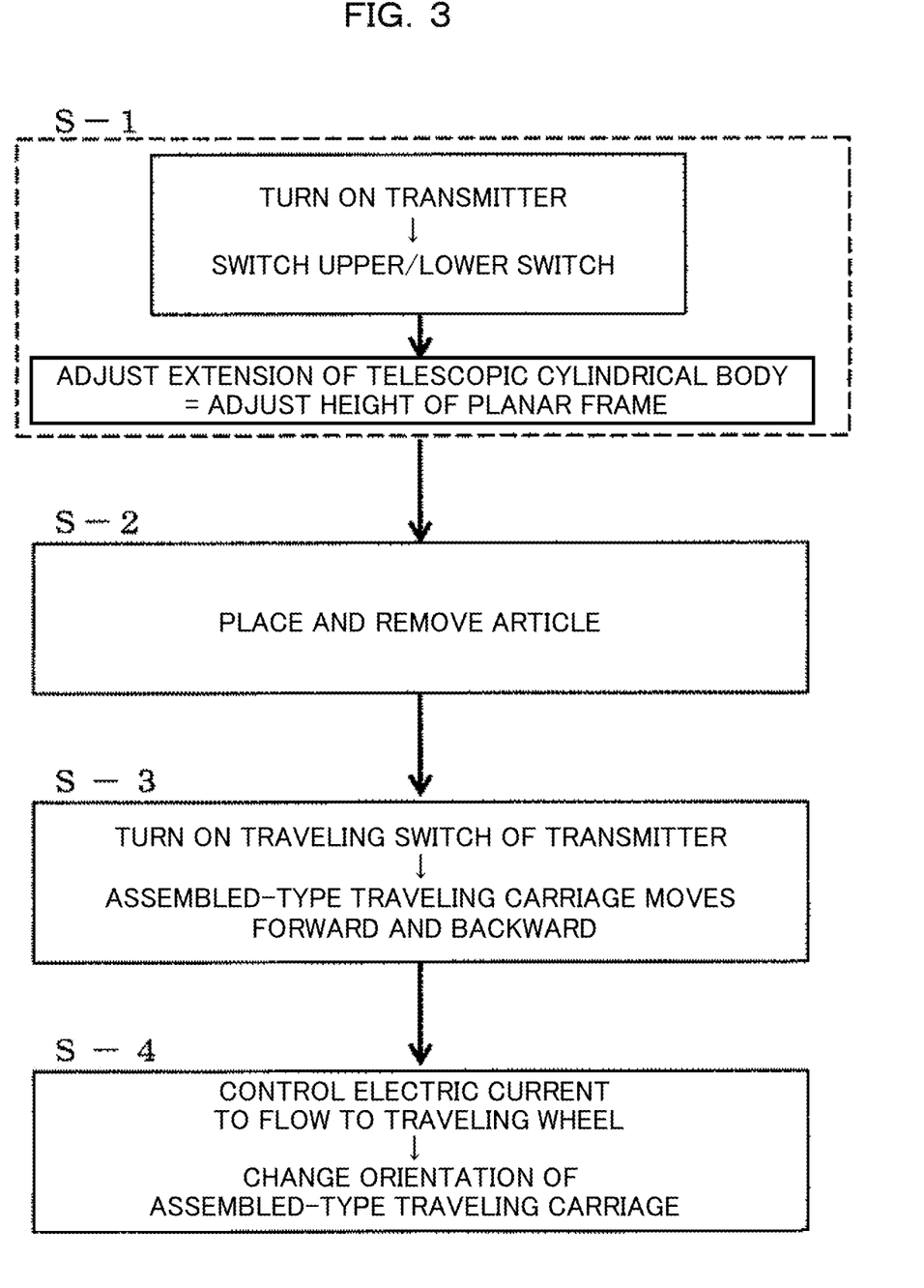
FIG. 3 is a flow diagram showing a procedure of operating an assembled-type traveling carriage according to Embodiment 1.

Here, description will now be made in relation to a procedure of usage of the assembled-type traveling carriage 1 being assumed to carry an article with reference to FIG. 3. In this description, the assembled-type traveling carriage 1 is assumed to couple the joint blocks 20 positioned at the upper portions of the telescopic cylindrical body sets 50 through four coupling rods 40.

In Step S-1, the switch of a remote-control transmitter of the assembled-type traveling carriage 1 is turned on and an upper/lower switch is set to "Upper" or "Lower". Responsively, the signal is transmitted to the receiver 15 incorporated in the telescopic cylindrical body 10, and the switch switches the flow of the electric current from the storage battery 12 to the electric motor 13 in a normal direction or a reverse direction to extend or withdraw the nests of the telescopic cylindrical body 10. This moves the planar frame of the assembled-type traveling carriage 1 upwards or downwards.

In Step S-2, the planar frame of the assembled-type traveling carriage 1 is stopped at a desired height and, for example, an article to be carried is placed on the planar frame.

In Step S-3, when a traveling switch of the remotely-controlled switch is turned on "forward" or "reverse", the signal is transmitted to the receiver 15 incorporated in the telescopic cylindrical body 10 and electric current is transmitted from the storage battery 12 to the traveling wheel 30 to cause the assembled-type traveling carriage 1 to move forward or backward.

In step S-4, the orientation of the assembled-type traveling carriage 1 is changed by varying between the rotation speeds of the driving motors 32 for the left and right traveling wheels 30. Specifically, when the traveling direction of the assembled-type traveling carriage 1 is to be turned right, an instruction from the remote-control transmitter lets a larger amount of electric current to flow to the driving motor 32 on the left to increase the rotation speed of the driving motor 32; and in contrast, when the traveling direction of the assembled-type traveling carriage 1 is to be turned left, an instruction from the remote-control transmitter lets a larger amount of electric current to flow to the driving motor 32 on the right to increase the rotation speed of the driving motor 32 on the right. The orientation can be smoothly changed by the structure that a pair of front or rear wheels are made to be the following wheels 35.

Embodiment 2

Figure 5:
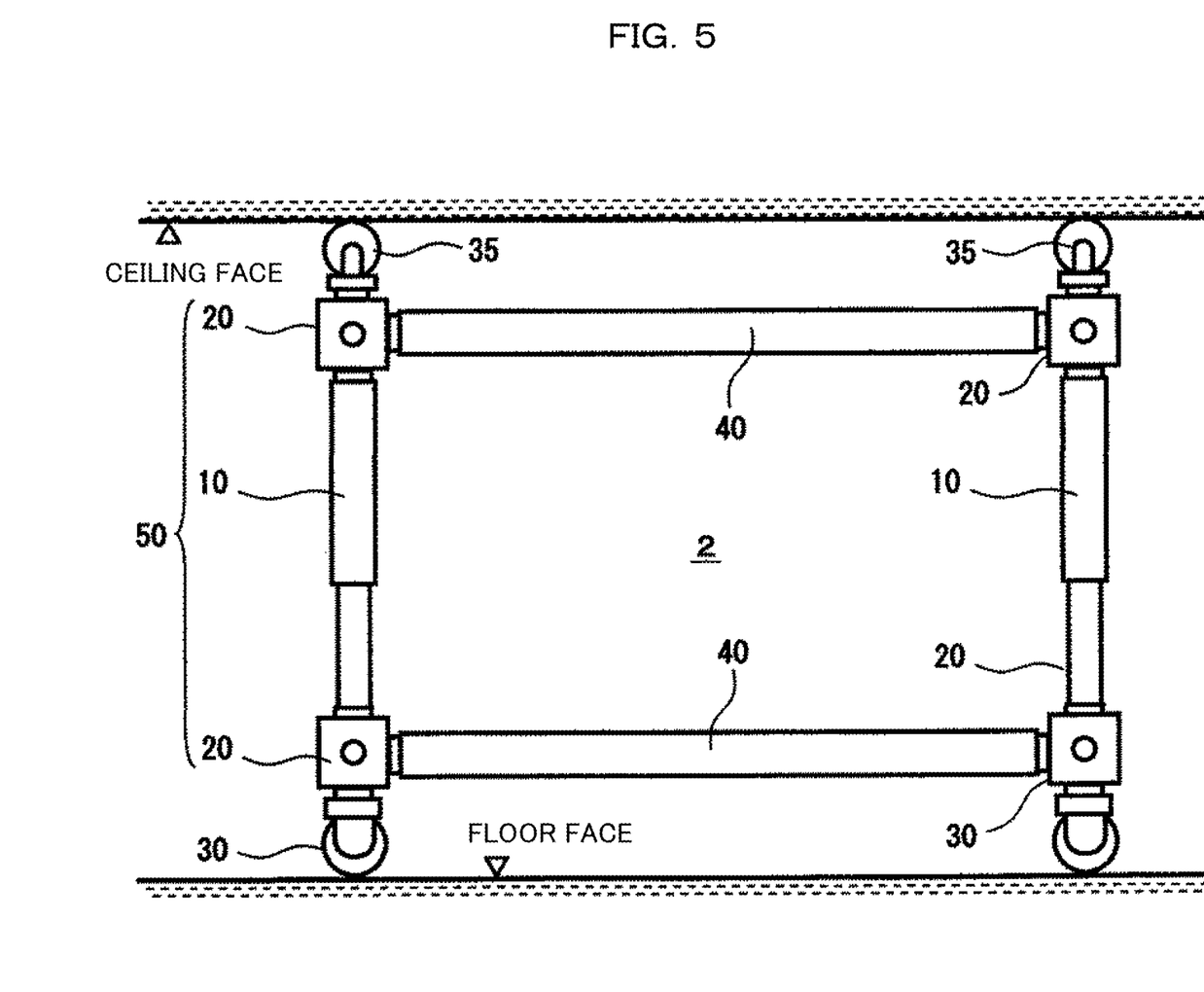
FIG. 5 is a side view of an assembled-type traveling carriage according to Embodiment 2.

Next, description will now be made in relation to an assembled-type traveling carriage 2 according to Embodiment 2 with reference to FIG. 5.

The assembled-type traveling carriage 2 has the substantially same structure as the assembled-type traveling carriage 1 except for a difference that the following wheels 35 are screwed into the upper portions of the telescopic cylindrical bodies 10, so description here made focuses on the difference.

The assembled-type traveling carriage 2 screws the following wheel 35 into the top-end face of the joint block 20 screwed into the upper portion of the each telescopic cylindrical body 10 of the assembled-type traveling carriage 1, the top-end face being on the top seen from the length direction of the telescopic cylindrical body 10. The following wheel 35 consists of a following-wheel main body and a male screw rotatably fixed (provided) to the following-wheel main body. Each following wheel 35 may of course be replaced with a traveling wheel 30. In addition, each telescopic cylindrical body 10 may be replaced by a telescopic cylindrical body 10A.

Each telescopic cylindrical body 10 constituting the assembled-type traveling carriage 2 is urged in the length direction, and when the assembled-type traveling carriage 2 is used in a room of a building, the following wheels 35 follow, being in an intimate contact with a ceiling face, so that the stability of the assembled-type traveling carriage 2 while traveling and operating is enhanced. Furthermore, not being a planar frame but being a stereoscopic frame, the assembled-type traveling carriage 2 can have an enhanced stiffness and facility when being used. Furthermore, since the assembled-type traveling carriage 2 supports the ceiling face, the quakeproof of the building can be enhanced.

The stability of the assembled-type traveling carriage 2 while traveling and operating can be enhanced even if the following wheels 35 positioned at the upper portion is replaced by suspension wheels (not shown) traveling or following on the rail suspended from the ceiling face or the rope extended near the ceiling face.

Embodiment 3

Next, description will now be made in relation to an assembled-type traveling carriage according to Embodiment 3 with reference to FIG. 6.

The assembled-type traveling carriage according to Embodiment 3 has the substantially same structure as the assembled-type traveling carriages 1 and 2 except for a difference that groove wheel sets 36 are screwed with the upper and lower portion of each telescopic cylindrical body set 50. Here, description will now be made in relation only to the different configuration of a groove wheel set 36.

The groove wheel sets 36 are screwed one with each of the upper and lower positions of each telescopic cylindrical body set 50, and are each formed of a pair of upper and lower groove wheels. Although the upper and lower groove wheel sets 36 may travel or either one of the groove wheel sets 36 may follow, Embodiment 3 assumes that the upper groove wheel set 36 follows and the lower groove wheel set 36 travels. FIG. 6 shows a following groove wheel set 36 positioned at the upper portion, in which the lower groove wheel is urged upwards and the upper and lower groove wheels surely sandwich a rope 60 in pair. In the groove wheel set 36 positioned at the lower portion, the lower groove wheel is also urged upwards.

The upper and lower groove wheels are pivotally supported by a box-shaped supporting board opened to the traveling direction. One of the supporting board positioned on the both sides of the groove wheels is configured to be openable. The rope 60 is inserted into the box-shaped supporting boards to be sandwiched by the pair of the upper and lower groove wheels under a state where the one supporting board is in the "open" state. This allows the assembled-type traveling carriage to travel, clinging the ropes 60 extended at the upper and lower portions. Multiple linear grooves perpendicular to the rotating direction are ditched on the groove of each groove wheel to prevent the rope 60 from slipping.

Alternatively, one or more groove wheel sets 36 may be screwed with into middle portions of each telescopic cylindrical body set 50 to sandwich one or more ropes 60 extended at the middle portions.

At least one of the upper and lower groove wheels sandwiching the rope 60 is provided with an electric motor that rotates the groove wheel. In this case, it is satisfactory that the electric motor is electrically connected to the storage battery 12 of the telescopic cylindrical body 10 through the joint block 20. The groove wheel may be driven by a hydraulic motor or an engine (internal combustion engine) in place of the electric motor.

The telescopic cylindrical body 10 may be replaced by the telescopic cylindrical body 10A.

Figure 6:
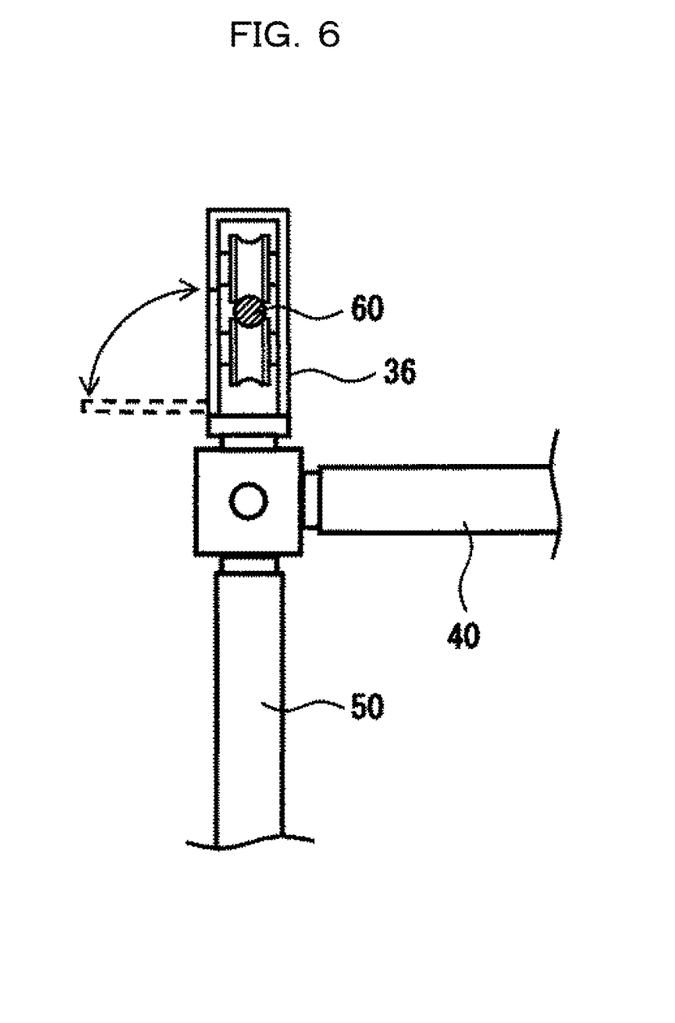
FIG. 6 is a partial front view of an assembled-type traveling carriage of Embodiment 3 seen from the traveling direction.

The orientation of the groove wheel set 36 (the orientation of traveling direction of the groove wheels) is not limited to one shown in FIG. 6, but can be arbitrarily set.

Embodiment 4

Figure 7:
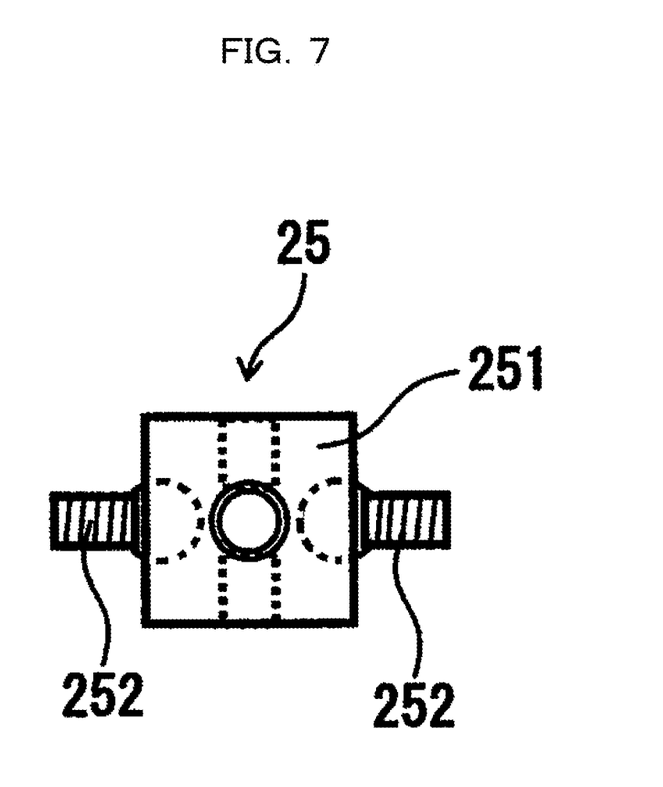
FIG. 7 is a side view of a joint block according to Embodiment 4.

Embodiment 4 is different only in the structure of the joint block, and description will now be made in relation only to a joint block 25 with reference to FIG. 7.

The joint block 25 is formed on a cubic joint block main body 251 and male screws 252. Each male screw 252 is coupled (connected) to the joint block main body 251 by means of a ball joint. Namely, spherical sockets are ditched on at least four faces horizontally facing among the faces of the joint block main body 251, and metal balls serving as the bases of the male screws 252 are fit into the respective socket, so that the male screws 252 are rotatable and swingable with respect to the joint block main body 251. For the above, female screws are connected to the both ends of each coupling rod 40 used in Embodiment 4 and serves as the counterpart of the screw means. Needless to say, the screw means of all faces of the joint block main body 251 may be ball joints.

Connecting multiple telescopic cylindrical body sets 50 by the coupling rods 40 through the joint blocks 25 can form a planar polygon frame and can enhance the degree of freedom of the shape of the assembled-type traveling carriage.

Miscellaneous (1) The above-described assembled-type traveling carriage 1 and the assembled-type traveling carriage 2 may be solely used as a carriage, and also may be changed into a self-propelled electric machine by mounting a unit exemplified by a vacuum cleaner of disclosures of the present inventor (Japanese Patent No. 5661961 and No. 5787428), an electric crane, a nursing care robot, and a farm machine, thereon and can be used inside a building as well as outdoor. Furthermore, the assembled-type traveling carriage may obtain electric power by placing a solar panel in place of the storage battery (second storage battery) on the planar frame. The electric power that the solar panel generates may be stored in a storage battery or may be directly supplied to the electric motors 13 and 32. The electric motors 13 and 32 may be replaced by engines. In this alternative, hydrogen may be generated by electrolyzing water with the electricity that the solar panel generates and used as the fuel of the engines.

(2) Under some states of the traveling surface, the following wheel and the following crawler belt may be replaced by low-friction synthesized resin, which slides on the traveling face or under the traveling face.

(3) If a controller is provided to the assembled-type traveling carriage and is connected to a personal computer and a traveling pattern can be programmed, the assembled-type traveling carriage can be used as a child educational device.

(4) The shape of the joint block is not limited to any form and may be a cuboid or a polyhedron.

(5) The driving device that drives the traveling wheels 30 or the crawler belt is not limited to a motor, but may be an engine.

(6) At least one of the electric motor 13 and the driving motor 32 may be provided with electric power from a power source (hereinafter, referred to as the external power source) external from the telescopic cylindrical body 10. If both the electric motor 13 and the driving motor 32 are provided with electric power from the external power source, the storage battery 12 incorporated in the corresponding telescopic cylindrical body 10 can be omitted or may be used in conjunction with the external power source. Examples of the external power source are a storage battery mounted on the assembled-type traveling carriage 1 or 2, and various generators such as an engine driven type. Further alternatively, the electric power may be supplied to the electric motor 13 and the driving motor 32 through power cables plugged in an electric outlet.

(7) The type and the dimension of an article to be mounted on and carried by the assembled-type traveling carriages 1 and 2 are not particularly limited. In a huge scale, the assembled-type traveling carriages 1 and 2 are able to carry a vehicle such as an automobile or a railway vehicle, a house, a greenhouse, and a festival float. When an article, such as an automobile, mounting thereon a battery is to be carried, at least one of the electric motor 13 and the driving motor 32 may be provided with electric power from the battery.

(8) The assembled-type traveling carriages 1 and 2 may be provided with outriggers that are installed so as to project from the side or from the front and the rear. If the assembled-type traveling carriages 1 and 2 operate in a state of mounting thereon an operation device, the outriggers are particularly useful because of inhibiting rollover of the assembled-type traveling carriages 1 and 2.

(9) A storage battery may be installed inside the coupling rod 40. In this case, it is satisfactory that the storage battery is electrically connected to at least one of the storage battery in the telescopic cylindrical body 10 and the driving motor 32 in the traveling wheel 30 through the joint block 20.

(10) The telescopic cylindrical bodies 10 and 10A, and the coupling rods 40 are assumed to be telescopic cylindrical bodies formed of polygon or round pipes, but may alternatively be telescopic cylindrical bodies formed of pipes having shapes except for polygon or round.

(11) If articles are put on the assembled-type traveling carriages 1 and 2, it is preferable that a top plate is preferably set on at least one of "the first planar plate assembled by the coupling rods 40 coupled to one another through the joint blocks 20 positioned at the upper portions" and "the second planar plate assembled by the coupling rods 40 coupled to one another through the joint blocks 20 positioned at the lower portions", and an article or the like is placed on the top plate. Setting the top plate in the above manner makes the assembled-type traveling carriages possible to be used as a cot or a stretcher.

Setting multiple top plates between the first planar frame and the second planar frame, or setting two or more planar frames and setting top plates on the respective planar frames allow the assembled-type traveling carriages 1 and 2 to be used as a shelf or a multi-bunk bed.

Setting a net-shaped article to the first planar frame and the second planar frame in place of a top plate allows the assembled-type traveling carriages to be used as a hammock.

(12) If the telescopic cylindrical body 10A shown in FIG. 4 is to be used, an accumulator 16, which provides a pressure to the hydraulic cylinder, may be installed to an appropriate position of the assembled-type traveling carriage 1 or 2 outside the telescopic cylindrical body 10A. In this case, the accumulator 16 may be replaced with a hydraulic providing system, consisting of, for example, a hydraulic pump and hydraulic tank and being installed inside or outside the telescopic cylindrical body 10A. The hydraulic pump may be driven by various means exemplified by electric power or an engine.

(13) If an engine (internal combustion engine) is to be used to drive the traveling wheel 30 or the groove wheels of the groove wheel set, also a fuel providing system (e.g., a fuel tank and a gas bomb) is mounted on the assembled-type traveling carriage 1 or 2.

(14) At least one of the traveling wheels 30, the following wheels 35, and the groove wheel of a groove wheel set may be coupled to a generator and electric power is generated by driving the generator by the rotation of the wheel. The electric power that the generator generates charges at least one of the storage battery 12 of the telescopic cylindrical body 10, the storage battery of the coupling rod 40, and a storage battery installed external of the telescopic cylindrical body 10 and the coupling rod 40.

(15) The assembled-type traveling carriages 1 and 2 may be made to be fixable by providing a scotch (stopper) to at least one of the traveling wheels 30 and the following wheels 35. When the assembled-type traveling carriage is to be used as a cot, for example, the assembled-type traveling carriage is moved to a desired position and then the rotation of the wheels is prohibited by the scotch to fix the position of the assembled-type traveling carriage. Consequently, the assembled-type traveling carriage can be used as a cot.

(16) The assembled-type traveling carriages 1 and 2 may be configured to automatically track a person or another assembled-type traveling carriage ahead by providing an automatic tracking function to the assembled-type traveling carriages 1 and 2.

(17) The foregoing embodiments describe the assembled-type traveling carriage having two-stage planar frame, which are formed of coupling rods 40 coupled to one another through the joint blocks 20, by using the telescopic cylindrical bodies 10. Alternatively, the assembled-type traveling carriage may have three-stage or more planar frames. Increasing frame stages makes assembled-type traveling carriage possible to be used as a shelf.

(18) The application of the assembled-type traveling carriage is not particularly limited. For example, in case of disaster, the assembled-type traveling carriage can be used as a cot or a stretcher as described above. As described in Embodiment 2, the assembled-type traveling carriage may aim at enhancing the quakeproof by supporting the ceiling face.

The assembled-type traveling carriage may be assembled around a building such that the building is positioned in the planar frame of the assembled-type traveling carriage (such that the telescopic cylindrical bodies 10 and the coupling rods 40 surrounds the building). Putting a building scaffolding on the telescopic cylindrical bodies 10 or the coupling rods 40 allows the assembled-type traveling carriage to be used for building repair or snow removal. Further, an operation device for repairing or a snow plough may be attached to the assembled-type traveling carriage.

The assembled-type traveling carriage 1 and 2 can be used as a snow shelter by attaching panels to frames formed of the telescopic cylindrical bodies 10 and the coupling rods 40 of the assembled-type traveling carriages 1 and 2 surrounding a building.

A particular point (e.g., eaves) of a building is supported directly by the assembled-type traveling carriage or indirectly through a supporting member, so that snowproof to the weight of snow accumulated on the roof and quakeproof can be enhanced. If the object is to enhance of snowproof and quakeproof, the assembled-type traveling carriage preferably has more planar frames.

Enhancing snowproof and quakeproof as the above allows the assembled-type traveling carriages 1 and 2 to be used as a quakeproof or snowproof enhancing facility.

In this case, the telescopic cylindrical bodies 10 and the coupling rods 40 are made into the withdrawn state to make the assembled-type traveling carriage compact and the assembled-type traveling carriage is self-propelled to the target building. Consequently, the assembled-type traveling carriage can be easily carried. After arriving at the building, the assembled-type traveling carriage is decomposed and then the assembled-type traveling carriage can be assembled around the building under a state where the telescopic cylindrical bodies 10 and the coupling rods 40 are elongated. Furthermore, the position of the assembled-type traveling carriage may be fixed by providing a scotch (stopper) to at least one the traveling wheels 30 and the following wheels 35 as described above.

Since the assembled-type traveling carriage is used for snow removal and snowproof for a limited period from snowfall to thaw, the assembled-type traveling carriage can be used as a normal carriage during the remaining period.

(19) Furthermore, the assembled-type traveling carriages 1 and 2 can be applied to, for example, a shelter, a blind, a fence, a prefabricated house, a warehouse (including a rocker), a storage premise (including one having a freezing function), a fuel supplier, a power source facility, a medical facility, an advertisement facility such as a signboard, a wildlife excluding facility, a projector for film images, a photographing device, and a stage setting.

(20) In each of the telescopic cylindrical bodies 10 and 10A and the coupling rods 40, the storage battery 12 and the electric motor 13 may be provided and a storage space may be also formed and may install therein a fuel tank, a gas bomb, a storage battery, a warehouse (including one having a freezing function). For example, if a door is formed facing the storage space on each of the telescopic cylindrical bodies 10 and 10A and the coupling rods 40, the stored article such as a fuel tank can be taken out from the door.

(21) The assembled-type traveling carriages 1 and 2 can be used as a farm machine when being used solely or in pair.

(21) A suspension may be provided to each of the traveling wheels 30, the following wheels 35, and the groove wheel sets 36.

(22) The assembled-type traveling carriages 1 and 2 may be used as walker that allows a person to get in the planar frame.

Effect

The foregoing embodiments brings the following effects.

(1) A carriage in the form of a self-propellable first planar frame is assembled by at least four telescopic cylindrical bodies, four joint blocks, four coupling rods, and four travelers, and can be planarily extended, centering around the first planar frame. This means that the traveling carriage can be widened or elongated according to various operation conditions and environment. If the coupling rods are formed to be of an extendable telescopic type, it is possible to obtain a planar frame having an arbitrary dimension.

(2) Forming a stereoscopic frame by screwing a joint block into the other end of each telescopic cylindrical body and coupling the telescopic cylindrical bodies by a coupling rods increases the frames to mount articles and enhances the efficiency in carrying articles.

(3) If the following wheels are screwed with the upper portions of the stereoscopic frame when the assembled-type traveling carriage is used in a room of a building, the telescopic cylindrical body is urged in the elongation direction to cause the following wheels to follow, being in intimate contact with the ceiling face, and consequently the stability of the assembled-type traveling carriage being traveling can be enhanced.

(4) If the travelers and the following wheels are replaced by suspendable wheels which are screwed at the upper portion of the stereoscopic frames through the joint blocks and which grasp, a rail or rope, the stability of the assembled-type traveling carriage being traveling can also be enhanced.

(5) The assembled-type traveling carriage can travel, sandwiching the upper and lower ropes extended in the air, by attaching the groove wheel sets, each having a pair of upper and lower groove wheels, through joint blocks at the upper and lower portion of each telescopic cylindrical body. This makes it possible to use the assembled-type traveling carriage even in a bumpy area such as a mountainous region.

(6) The assembled-type traveling carriage is made to be a self-propellable electric machine by placing a storage battery on one planar frame (one of the first planar frame and the second planar frame) and placing an electric machine unit on another planar frame (the other of the first planar frame and the second planar frame).

(7) At least one of the first planar frame and the second planar frame is formed by swingably connecting a male screw serving as the other one of the screw means of the joint block to the joint block main body by means of a ball joint. This allows the planar frame to transform into a parallelogram as well as a rectangular. Furthermore, since coupling the multiple telescopic cylindrical body sets to one another by coupling rods can planarily form a polygon, the degree of freedom of the assembled-type traveling carriage can be enhanced.

DESCRIPTION OF REFERENCE NUMBER 1 assembled-type traveling carriage according to Embodiment 1

2 assembled-type traveling carriage according to Embodiment 2
10,10A telescopic cylindrical body
11 male screw (one of the first screw means and the second screw means of the telescopic cylindrical body)
12 storage battery (energy storage unit, first storage battery)
13 electric motor (actuator)
15 receiver
16 accumulator (energy storage unit)
20 joint block
22 female screw of the joint block (the other of the first screw means, the other of the second screw means, one of the third screw means, one of the fourth screw means)
25 joint block according to Embodiment 3
252 male screw of the joint block according to Embodiment 3 (one of the third screw means, one of the fourth screw means)
30 traveling wheel (traveler)
32 driving motor (driving device)
33 male screw of the traveling wheel (other screw of the fourth screw means)
35 following wheel (following traveler)
36 groove wheel set
40 coupling rod
41 male screw of coupling rod (the other of the third screw means)
50 telescopic cylindrical body set
60 rope
111 hydraulic cylinder (actuator)

What is claimed is:

1. A traveling carriage comprising:
a plurality of telescopic cylindrical body sets, each of the plurality of telescopic cylindrical body sets comprising:
   a traveler;
   a first joint block connected to the traveler via a screw;
   a telescopic cylindrical body connected to the first joint block via a screw; and
   a second joint block connected to the telescopic cylindrical body via a screw; and
a plurality of rods connected to each other in a rectangular shape, each of the second joint blocks being connected to each of two rods of the plurality of rods via a screw.

2. The traveling carriage according to claim 1, wherein one of the telescopic cylindrical bodies is configured to incorporate an actuator,
the one of the telescopic cylindrical bodies comprises:
   an energy storage configured to store operation energy that operates the actuator; and
   a switch configured to switch supply of the operation energy to the actuator.

3. The traveling carriage according to claim 2, wherein the actuator is an electric motor,
one of the travelers is configured to be attached with a driving device that is an electric driving motor,
the energy storage is a first storage battery, and
the driving motor is electrically connected to the first storage battery by screwing a corresponding one of the plurality of the travelers to one of the telescopic cylindrical bodies through a corresponding one of the plurality of the first joint blocks.

4. The traveling carriage according to claim 1, wherein each rod of the plurality of rods is an extendable telescopic cylindrical body.

5. The traveling carriage according to claim 3, wherein:
each telescopic cylindrical body of the telescopic cylindrical bodies comprises a receiver that receives a signal from a remote-control transmitter to operate the switch and control electric current to the electric motor and the drive motor.

6. The traveling carriage according to claim 1, wherein the plurality of telescopic cylindrical body sets and the plurality of rods are configured to configure the traveling carriage to be extendable in a lateral direction of a traveling direction and in the traveling direction.

7. A traveling carriage comprising:
four telescopic cylindrical bodies, each of the four telescopic cylindrical bodies being rotatably provided with a first one of a first male screw and a first female screw at a first end thereof and a first one of a second male screw and a second female screw at a second end thereof, and incorporating an actuator configured to extend and withdraw a nest;
a plurality of first joint blocks, each of the plurality of first joint blocks being provided with a second one of the first male screw and the first female screw and also provided with a first one of a third male screw and a third female screw;
a plurality of second joint blocks, each of the plurality of second joint blocks being provided with a second one of the second male screw and the second female screw and also provided with a first one of a fourth male screw and a fourth female screw;
a plurality of travelers, each of the plurality of travelers being rotatably provided with a second one of the third male screw and the third female screw and attached with a driving device; and
a plurality of coupling rods, each coupling rod of the plurality of coupling rods being rotatably provided with a second one of the fourth male screw and the fourth female screw, wherein
each of the four telescopic cylindrical bodies are coupled to one of the plurality of first joint blocks at the first end thereof and to one of the plurality of second joint blocks at the second end thereof,
each of the plurality of first joint blocks is coupled to one of the travelers; and
the four telescopic cylindrical bodies are coupled to one another by the plurality of coupling rods through the plurality of second joint blocks such that the plurality of coupling rods are formed into a first planar frame.

8. The traveling carriage according to claim 7, wherein each of the four telescopic cylindrical bodies further comprises:
an energy storage unit configured to store operation energy that operates the actuator; and
a switch configured to switch supply of the operation energy to the actuator.

9. The traveling carriage according to claim 8, wherein the actuator is an electric motor;
the driving device is an electric driving motor;
the energy storage unit is a first storage battery; and
the driving motor is electrically connected to the first storage battery by screwing a corresponding one of the plurality of the travelers to one of the telescopic cylindrical bodies through a corresponding one of the plurality of the first joint blocks.

10. The traveling carriage according to claim 7, wherein each coupling rod of the plurality of coupling rods is an extendable telescopic cylindrical body and the first planar frame is in a rectangular shape.

11. The traveling carriage according to claim 7, wherein:
each telescopic cylindrical body of the four telescopic cylindrical bodies comprises a receiver that receives a signal from a remote-control transmitter to operate the switch and control electric current to the electric motor and the drive motor.

12. The traveling carriage according to claim 7, wherein a plurality of telescopic cylindrical body sets, each formed by screwing one of the plurality of travelers to a corresponding one of the four telescopic cylindrical bodies through a corresponding one of the plurality of the first joint blocks, are coupled to one another by the plurality of coupling rods and configure the traveling carriage to be extendable in a lateral direction of a traveling direction and in the traveling direction.

13. The traveling carriage according to claim 7, wherein one or more following traveler, each pivotably supporting the first one of the male screw and the female screw, are screwed to the first planar frame in place of at least one of the travelers.

14. The traveling carriage according to claim 7, wherein
the assembled traveling carriage is assembled into a stereoscopic frame through assembling a second planar frame having a rectangular shape by screwing the second ends the telescopic cylindrical bodies with the plurality of first joint blocks and coupling the four telescopic cylindrical bodies to one another by coupling rods through the plurality of first joint blocks.

15. The traveling carriage according to claim 13, wherein the travelers or the following travelers travel or follow on a ceiling face, following movement of the traveling carriage, by urging the telescopic cylindrical bodies in an extending direction and screwing the travelers or the following travelers on an upper portion of each telescopic cylindrical body of the telescopic cylindrical bodies through one of the plurality of second joint blocks.

16. The traveling carriage according to claim 7, wherein
a traveling wheel or a following wheel is attached to an upper portion of one of the telescopic cylindrical bodies through one of the plurality of second joint blocks; and
the traveling wheel or the following wheel travels or follows movement of the traveling carriage, being accompanied by the movement of the traveling carriage and grasping a rail suspended from a ceiling face or a rope extended near the ceiling face.

17. The traveling carriage according to claim 7, wherein
a groove wheel set including a pair of upper and lower groove wheels is attached to each of an upper portion and a lower portion of one of the telescopic cylindrical bodies through the plurality of first joint blocks and the plurality of second joint blocks in place of one of the travelers attached to the lower portion of one of the telescopic cylindrical bodies;
the groove wheel sets attached to the upper portion and the lower portion are both for traveling or either one of the groove wheel sets are for following; and
the groove wheel sets travel or follow movement of the traveling carriage, being accompanied by the movement of traveling carriage and sandwiching ropes suspended over and under the traveling carriage.

18. The traveling carriage according to claim 7, wherein
a second storage battery is placed on one of a first one of the first planar frame and the second planar frame; and
an electric machinery unit that uses the second storage battery as a power source is placed on a second one of the first planar frame of the second planar frame.

19. The traveling carriage according to claim 7, wherein
the first one of the fourth male screw and the fourth female screw of each of the plurality of second joint blocks is a male screw;
the male screw is swingably connected to a main body of the corresponding one of the plurality of joint blocks through a ball joint; and
the second one of the fourth male screw and the fourth female screw of each of the plurality of coupling rods is a female screw.

20. A traveling carriage comprising:
a plurality of telescopic cylindrical bodies, each of the plurality of telescopic cylindrical bodies being rotatably provided with a first group of a first male screw and a first female screw at a first end thereof and a first group of a second male screw and a second female screw at a second end thereof, and incorporating an actuator configured to extend and withdraw;
a plurality of first joint blocks, each of the plurality of first joint blocks being provided with the first group of the first male screw and the first female screw and also provided with a first group of a third male screw and a third female screw;
a plurality of second joint blocks, each of the plurality of second joint blocks being provided with the second group of the second male screw and the second female screw and also provided with a first group of a fourth male screw and a fourth female screw;
a plurality of travelers, each of the plurality of travelers being rotatably provided with the third group of the third male screw and the third female screw and attached with a driving device; and
a plurality of coupling rods, each coupling rod of the plurality of coupling rods being rotatably provided with the fourth group of the fourth male screw and the fourth female screw, wherein
each of the plurality of telescopic cylindrical bodies are coupled to one of the plurality of first joint blocks at the first end thereof and to one of the plurality of second joint blocks at the second end thereof,
each of the plurality of first joint blocks is coupled to one of the travelers; and the plurality of telescopic cylindrical bodies are coupled to one another by the plurality of coupling rods through the plurality of second joint blocks such that the plurality of coupling rods are formed into a first planar frame.

* * * * *